United States Patent
Kinpara

(10) Patent No.: US 10,189,541 B2
(45) Date of Patent: Jan. 29, 2019

(54) ELECTRICALLY ASSISTED BICYCLE

(71) Applicant: YAMAHA HATSUDOKI KABUSHIKI KAISHA, Iwata-shi, Shizuoka (JP)

(72) Inventor: Yuki Kinpara, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 127 days.

(21) Appl. No.: 15/364,373

(22) Filed: Nov. 30, 2016

(65) Prior Publication Data

US 2017/0151999 A1    Jun. 1, 2017

(30) Foreign Application Priority Data

Dec. 1, 2015   (JP) ................... 2015-234610

(51) Int. Cl.
*B62M 3/08* (2006.01)
*B62M 6/45* (2010.01)
(Continued)

(52) U.S. Cl.
CPC .............. *B62M 6/50* (2013.01); *B62K 11/04* (2013.01); *B62K 21/26* (2013.01); *B62K 23/06* (2013.01); *B62M 3/08* (2013.01); *B62M 6/45* (2013.01); *B62M 6/60* (2013.01); *B62M 6/70* (2013.01); *B62M 6/90* (2013.01); *B60Y 2200/13* (2013.01);
(Continued)

(58) Field of Classification Search
CPC . B62M 6/50; B62M 6/60; B62M 6/70; B62M 3/08; B62M 6/45; B62M 6/90; B62K 23/06; B62K 11/04; B62K 21/26; B62K 2207/04; B60Y 2200/13; B60Y 2200/91
See application file for complete search history.

(56) References Cited

U.S. PATENT DOCUMENTS

| 6,247,548 B1* | 6/2001 | Hayashi | .............. B60L 11/1801 180/206.2 |
| 2016/0059928 A1* | 3/2016 | Yeh | ........................ A61G 5/022 701/22 |
| 2016/0356379 A1* | 12/2016 | Roland | ............. F16H 61/66272 |

FOREIGN PATENT DOCUMENTS

| EP | 0 517 224 A2 | 12/1992 |
| JP | 2000-085675 A | 3/2000 |

(Continued)

OTHER PUBLICATIONS

Machine translation of JP 2012-144061 retrieved from espacenet on Jun. 24, 2018 (Year: 2018).*

(Continued)

*Primary Examiner* — Thomas Ingram
(74) *Attorney, Agent, or Firm* — Keating and Bennett, LLP

(57) ABSTRACT

An electrically assisted bicycle includes an electric motor which applies a walk-push assisting torque to a rear wheel of the bicycle when a rider propels the bicycle by pushing it while walking, and a motor controller configured or programmed to execute a first mode in which the electric motor applies no torque to the rear wheel, a second mode in which the electric motor applies to the rear wheel a stay assisting torque which causes the electrically assisted bicycle to stay in a position where the rider wants to stay, and a third mode in which the electric motor applies the walk-push assisting torque to the rear wheel, wherein the first mode, the second mode, and the third mode are able to be selected by using an operator able to be operated by the rider.

3 Claims, 7 Drawing Sheets

(51) Int. Cl.
*B62M 6/50* (2010.01)
*B62M 6/60* (2010.01)
*B62M 6/70* (2010.01)
*B62M 6/90* (2010.01)
*B62K 11/04* (2006.01)
*B62K 21/26* (2006.01)
*B62K 23/06* (2006.01)

(52) U.S. Cl.
CPC ....... *B60Y 2200/91* (2013.01); *B62K 2207/04* (2013.01)

(56) References Cited

FOREIGN PATENT DOCUMENTS

| | | | | |
|---|---|---|---|---|
| JP | 2000-095180 A | 4/2000 | | |
| JP | 2001-239980 A | 9/2001 | | |
| JP | 2004306818 A | * 11/2004 | ............. | B62M 6/50 |
| JP | 2012144061 A | * 8/2012 | ............. | B62K 23/02 |
| KR | 10-2012-0019287 A | 3/2012 | | |
| WO | 2012/093435 A1 | 7/2012 | | |

OTHER PUBLICATIONS

Machine translation of JP 2004-306818 retrieved from espacenet on Jun. 24, 2018 (Year: 2018).*

* cited by examiner

ELECTRICALLY ASSISTED BICYCLE

CROSS REFERENCE TO RELATED APPLICATIONS

This application claims the benefit of priority to Japanese Patent Application No. 2015-234610 filed on Dec. 1, 2015. The entire contents of this application are hereby incorporated herein by reference.

BACKGROUND OF THE INVENTION

1. Field of the Invention

The present invention relates to an electrically assisted bicycle.

2. Description of the Related Art

Electrically assisted bicycles are known from Japanese Patent Unexamined Publication JP-A 2000-95180 and the like which are equipped with a walk-push function in which a rider propels the bicycle by pushing it while walking with his or her hands gripping the bicycle. In these electrically assisted bicycles, the walk-push effort of the rider is assisted by causing an electric motor to output a walk-push assisting torque when the rider propels the bicycle by pushing it while walking on a steep upward slope after getting off the bicycle.

In the electrically assisted vehicle equipped with the walk-push function described in the JP-A 2000-95180, when attempting to output the walk-push assisting torque by operating an operating portion while stopping the bicycle on the upward slope, the vehicle is caused to move backwards along the gradient until the walk-push assisting torque is actually outputted. On the other hand, the vehicle is caused to move forwards while the walk-push assisting torque is being outputted. Because of this, it is difficult for the rider to stay with the bicycle in a position on the slope where he or she gets off the bicycle, for example.

SUMMARY OF THE INVENTION

Preferred embodiments of the present invention provide an electrically assisted bicycle that enables a rider to easily hold the bicycle to stay in a position where he or she wants the bicycle to stay and to also easily release the holding state.

According to a preferred embodiment of the present invention, an electrically assisted bicycle includes an electric motor that applies a walk-push assisting torque to a wheel of the bicycle when a rider propels the bicycle by pushing it while walking; a controller configured or programmed to execute a first mode in which the electric motor applies no torque to the wheel, a second mode in which the electric motor applies a stay assisting torque to the wheel to allow the electrically assisted bicycle to stay in a position where the rider wants the bicycle to stay, and a third mode in which the electric motor applies the walk-push assisting torque to the wheel; and an operator operable by the rider to select the first mode, the second mode, or the third mode.

According to the electrically assisted bicycle described above, the first mode, the second mode, and the third mode are selected by the rider operating the operator. Namely, the rider is able to select the first mode, the second mode, and the third mode in a positive manner. Due to this, when the rider wants to stay in a certain position on an upward slope, the rider is able to easily execute the second mode. Alternatively, when the rider wants to move backwards on the upward slope, the rider is able to easily move backwards by selecting the first mode. Alternatively, when the rider attempts to propel the bicycle from the certain position by pushing it while walking on the upward slope, the rider is able to obtain the walk-push assisting torque by easily executing the third mode by operating the operator.

In this way, since the rider is able to select the first mode, the second mode, and the third mode in a positive manner, the output of the electric motor does not interrupt the action that the rider wants to execute, such that the rider is able to select the mode which is suitable for the action that the rider wants to execute.

According to a preferred embodiment of the present invention, the electrically assisted bicycle may include an operator including a first operator and a second operator which differs from the first operator, and the controller is configured or programmed to execute the first mode when the first operator and the second operator are not operated, the second mode when the first operator or the second operator is operated, and the third mode when the first operator and the second operator are operated.

According to the electrically assisted bicycle described above, when the rider operates the first operator or the second operator without distinguishing either of the first operator and the second operator, a torque is applied which allows the bicycle to stay in the position where the rider wants the bicycle to stay, such that the rider is able to easily stay with the bicycle in the that position, and the convenience of the rider is enhanced.

According to a preferred embodiment of the present invention, the electrically assisted bicycle may include an operator including a stay operator and a walk-push operator, and the controller is configured or programmed to execute the first mode when the stay operator and the walk-push operator are not operated, the second mode when the walk-push operator is not operated and the stay operator is operated, and the third mode when the walk-push operator is operated irrespective of the operation of the stay operator.

According to the electrically assisted bicycle described above, the walk-push assisting torque is obtained whenever the rider wants the walk-push assisting torque.

According to a preferred embodiment of the present invention, the operator preferably shifts the modes in the order of the first mode, the second mode, and the third mode or in the order of the first mode, the third mode, and the second mode.

According to the electrically assisted bicycle described above, since the rider selects the first mode to the third mode by operating a single operator, the rider is able to select the modes through a simple operation.

According to preferred embodiments of the present invention, the electrically assisted bicycle enables the rider to easily hold the bicycle to stay in the position where he or she wants to stay and also to easily release the holding state.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, referring to FIG. 1, preferred embodiments of the present invention will be described. Dimensions of constituent elements in the figures do not always represent actual dimensions of the constituent elements and dimensional ratios of the constituent elements.

In the following description, front, rear, left and right mean front, rear, left and right as viewed from a rider who is seated on a seat 24 of an electrically assisted bicycle while gripping handgrips of a handlebar 23.

First, an electrically assisted bicycle according to a first preferred embodiment of the present invention will be described.

Figure 1:
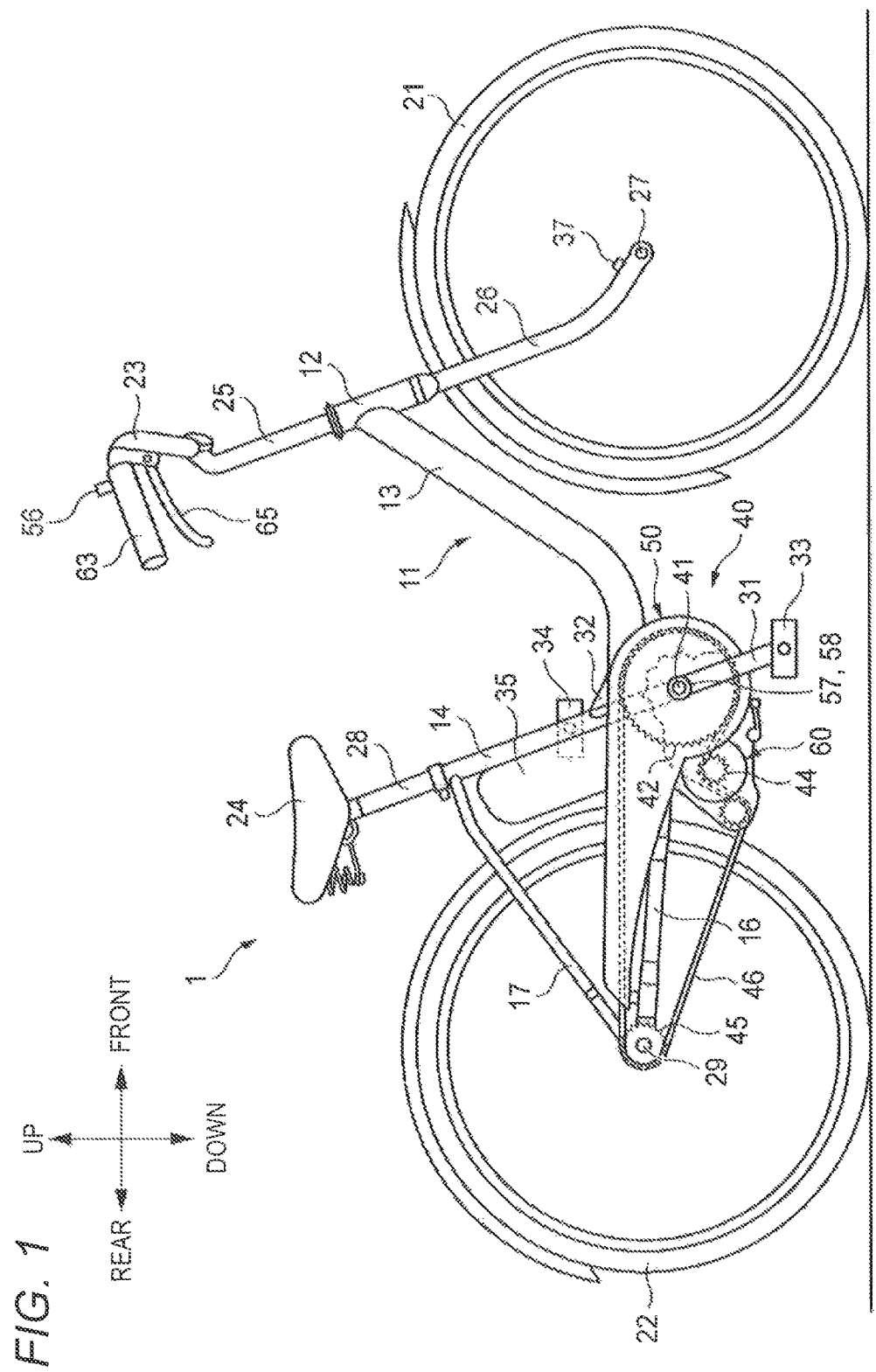
FIG. 1 is a side view of an electrically assisted bicycle according to a first preferred embodiment of the present invention.

As shown in FIG. 1, an electrically assisted bicycle 1 includes pedals 33, 34 and an electric motor 60. The electrically assisted bicycle 1 is driven by a total of a drive torque of a pedal torque generated by a rider pressing the pedals 33, 34 and a motor torque outputted from the electric motor 60. The motor torque of the electric motor 60 defines an assisting torque which assists the rider in pressing the pedals 33, 34. Additionally, in the electrically assisted bicycle 1, the electric motor 60 imparts an assisting torque (walk-push assisting torque) to a rear wheel 22 which assists the rider in pushing the bicycle while walking with the handlebar 23 gripped by the rider.

The electrically assisted bicycle 1 includes a body frame 11 which extends in a front-to-rear direction. The electrically assisted bicycle 1 also includes a front wheel 21, the rear wheel 22, the handlebar 23, a saddle or seat 24 and a power unit 40.

The body frame 11 includes a head tube 12, a down tube 13, a seat tube 14, a pair of chain stays 16 and a pair of seat stays 17. The head tube 12 is located at a front portion of the electrically assisted bicycle 1. A front portion of the down tube 13, which extends toward the rear, is connected to the head tube 12. The seat tube 14 is connected to a rear portion of the down tube 13. The seat tube 14 extends obliquely upwards and rearwards from a rear end portion of the down tube 13.

A handlebar stem 25 is inserted into the head tube 12 so as to turn freely. The handlebar 23 is fixed to an upper end portion of the handlebar stem 25. A front fork 26 is fixed to a lower end portion of the handlebar stem 25. The front wheel 21 is supported rotatably at a lower end portion of the front fork 26 by an axle shaft 27. A front wheel speed sensor 37 is provided at the lower end portion of the front fork 26 to detect a vehicle speed based on rotations of the front wheel 21.

A seat post 28 is inserted into the cylindrical seat tube 14. The seat 24 is provided at an upper end portion of the seat post 28.

The pair of chain stays 16 are provided so as to hold the rear wheel 22 therebetween from the left and right of the rear wheel 22. The pair of chain stays 16 extend from a rear portion of the down tube 13 towards a rotational center of the rear wheel 22. The pair of seat stays 17 extend from an upper portion of the seat tube 14 towards the rotational center of the rear wheel 22. The rear wheel 22 is supported rotatably at rear end portions of the chain stays 16 and the seat stays 17.

A battery 35 is disposed at the rear of the seat tube 14, and the battery 35 supplies electric power to the electric motor 60 of the power unit 40. The battery 35 includes a chargeable-dischargeable rechargeable battery and a battery controller, which are not shown. The battery controller controls the charging and discharging of the rechargeable battery and monitors an output current from the battery and a residual capacity or the state of charge of the rechargeable battery.

The power unit 40 includes a crank shaft 41, a crank output shaft (not shown), a driving sprocket 42, a pedal torque detector 57, a crank rotation detector 58, the electric motor 60 and an auxiliary sprocket 44 which are incorporated in a unit case 50 as a unit. The power unit 40 is fastened to the body frame 11 with bolts, for example.

The crank shaft 41 is provided rotatably below the seat tube 14. The crank shaft 41 penetrates the unit case 50 in a left-to-right direction to be supported thereon. Crank arms 31, 32 are attached to both end portions of the crank shaft 41. The pedals 33, 34 are attached individually to distal ends of the crank arms 31, 32 in a rotatable manner. The pedal torque detector 57 detects a pedal torque which the rider inputs into the crank shaft 41 via the pedals 33, 34. The crank rotation detector 58 detects a rotation of the crank shaft 41 which is generated when the rider rotates the pedals 33, 34. A crank output shaft (not shown) preferably has a cylindrical shape which is concentric with the crank shaft 41 and is connected to the crank shaft 41 via a one-way clutch, not shown.

The drive sprocket 42 is attached to a right end of the crank output shaft (not shown). This drive sprocket 42 rotates together with the crank shaft 41. A driven sprocket 45 is preferably concentric with a rear axle shaft 29 of the rear wheel 22. The driven sprocket 45 is connected to the rear wheel 22 via a one-way clutch, not shown.

An endless chain 46 extends between and wraps around the drive sprocket 42 and the driven sprocket 45. This allows the drive sprocket 42 to rotate when the rider rotates the pedals 33, 34 with his or her feet. Further, the rotation of the drive sprocket 42 is transmitted to the driven sprocket 45 by way of the chain 46 to drive the rear wheel 22.

The electric motor 60 is disposed at the rear of the crank shaft 41 within the unit case 50. The auxiliary sprocket 44 is provided on an output shaft of the electric motor 60. Electric power is supplied to the electric motor 60 from the battery 35. Supplying electric power to the electric motor 60 causes the electric motor 60 to rotate. The rotation of the electric motor 60 is transmitted to the chain 46 by way of the auxiliary sprocket 44. In this way, when electric power is supplied to the electric motor 60, motor torque is generated in the electric motor 60. This motor torque is transmitted to the rear wheel 22 via the chain 46.

Grip portions 63 are provided at left and right end portions of the handlebar 23. The grip portions 63 preferably extend in or substantially in a front-to-rear direction. The rider is able to grip the grip portions 63.

Brake levers 65 are provided near the grip portions 63. When the rider operates the right brake lever 65 with his or her right hand, a braking force is applied to the front wheel 21. When the rider operates the left brake lever 65 with his or her left hand, a braking force is applied to the rear wheel 22.

An operator 56 is provided near the grip portion 63 on the handlebar 23. The operator 56 is able to be operated by a finger of a hand of the rider by which the rider grips the grip portion 63. The operator 56 is connected to a controller 100 including a motor controller 95, which will be described below, via a signal line (whose illustration is omitted). The operator 56 preferably includes a first operator 71 and a second operator 72, which will be described below, that are able to be individually switched on/off.

In the electrically assisted bicycle 1 described above, the electric motor 60 is controlled by the controller 100 to apply motor torque to the rear wheel 22.

Figure 2:
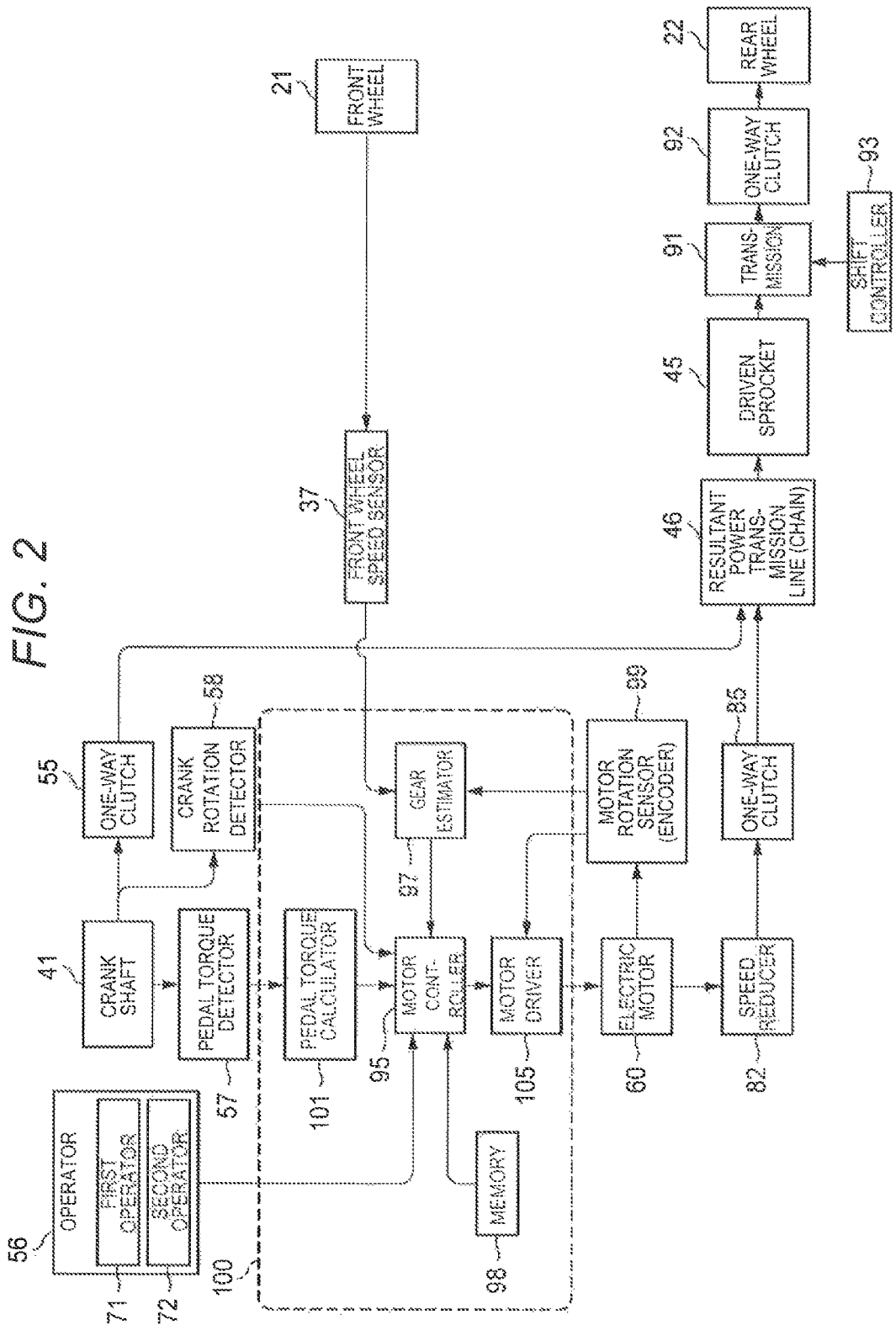
FIG. 2 is a block diagram showing functions of the electrically assisted bicycle according to the first preferred embodiment of the present invention.

FIG. 2 is a block diagram showing the functions of the electrically assisted bicycle 1. As shown in FIG. 2, the controller 100 includes a pedal torque calculator 101, the motor controller 95, a motor driver 105, a gear estimator 97 and a memory 98. The operator 56 is connected to the motor controller 95. The operator 56 includes the first operator 71 and the second operator 72.

Next, a power transmission line will be described.

When the rider presses the pedals 33, 34 to rotate the crank shaft 41, the rotation of the crank shaft 41 is transmitted to the chain 46 by way of the one-way clutch 55. The one-way clutch 55 transmits only a forward rotation of the crank shaft 41 to the chain 46 and does not transmit a reverse rotation of the crank shaft 41 to the chain 46.

The rotation of the chain 46 is transmitted to the driven sprocket 45 on the rear wheel 22. The rotation of the driven sprocket 45 is transmitted to the rear wheel 22 by way of a transmission 91 and a one-way clutch 92.

The transmission 91 changes speed gears in response to the operation of a shift controller 93 by the rider. The one-way clutch 92 transmits the rotation of the driven sprocket 45 to the rear wheel 22 only when the rotation speed of the driven sprocket 45 is faster than the rotation speed of the rear wheel 22. When the rotation speed of the driven sprocket 45 is slower than the rotation speed of the rear wheel 22, the one-way clutch 92 does not transmit the rotation of the driven sprocket 45 to the rear wheel 22.

The rotation of the electric motor 60 is transmitted to a one-way clutch 85 via a speed reducer 82. The one-way clutch 85 transmits only the rotation of the electric motor 60 to the chain 46 in a direction in which the speed reducer 82 rotates the chain 46 forwards but does not transmit the rotation of the electric motor 60 to the chain 46 in a direction in which the speed reducer 82 rotates the chain 46 reversely.

In this way, the pedal torque inputted into the crank shaft 41 and the motor torque of the electric motor 60 are combined together at the chain 46.

Next, signal lines will be described.

When the rider rotates the crank shaft 41, the pedal torque detector 57 which is provided on the vehicle generates a signal corresponding to the pedal torque inputted into the crank shaft 41. The pedal torque detector 57 inputs the signal into the pedal torque calculator 101.

The pedal torque calculator 101 converts the signal from the pedal torque detector 57 into the pedal torque exerted on the pedals 33, 34 by the rider. The pedal torque calculator 101 inputs the value of the pedal toque into the motor controller 95.

The crank rotation detector 58 is preferably a sensor that detects the phase of the crank shaft 41. The crank rotation detector 58 generates a signal corresponding to the phase of the crank shaft 41. The crank rotation detector 58 inputs the signal into the motor controller 95.

The front wheel speed sensor 37 transmits a signal which signals the rotation speed of the front wheel 21 to the gear estimator 97. The gear estimator 97 estimates a gear from the rotation speed of the front wheel 21 and transmits this information to the motor controller 95.

A motor rotation sensor 99 is provided on the electric motor 60. The motor rotation sensor 99 detects a revolution speed of the electric motor 60 and transmits the detected revolution speed to the gear estimator 97 and the motor driver 105.

The motor controller 95 calculates a command value to apply an appropriate assisting force from outputs from the pedal torque calculator 101, the crank rotation detector 58 and the gear estimator 97 and information stored in the memory 98 and transmits the calculated command value to the motor driver 105.

The motor torque controller 95 calculates the command value based on, for example, the crank rotation speed or the pedal torque provided to the pedals 33, 34 by the rider or by referring to a map stored in the memory 98 which is prepared based on a relationship among the crank rotation speed, the pedal torque and the motor torque.

The motor driver 105 supplies, based on the command value from the motor controller 95, electric power corresponding to the command value to the electric motor 60 from the battery 35. This drives the electric motor 60 to which the electric power is supplied to generate a predetermined motor torque.

In the electrically assisted bicycle 1 according to the present preferred embodiment, the motor controller 95 controls the electric motor 60 in four modes (a first mode, a second mode, a third mode, a fourth mode) which differ from one another.

The first mode is a mode in which the electric motor 60 applies no torque to the rear wheel 22. In the first mode, the motor controller 95 outputs no command value to the motor driver 105, the electric motor 60 is not energized, and the electric motor 60 applies no torque to the rear wheel 22.

Alternatively, in the first mode, the motor controller 95 is configured or programmed to output a command to the motor driver 105. The first mode includes a state in which the electric motor 60 is energized so as to output such a small torque that the torque outputted from the electric motor 60 is lost while being transmitted to the rear wheel 22 by way of the speed reducer 82, the one-way clutch 85, the chain 46, the driven sprocket 45, the transmission 91 and the one-way clutch 92, such that no torque is applied to the rear wheel 22.

In the second mode, the electric motor 60 applies to the rear wheel 22 a stay assisting torque which is large enough to allow the electrically assisted bicycle 1 to stay in a position where the rider wants to stay. In the second mode, the motor controller 95 outputs a stay command value to the motor driver 105. This causes the electric motor 60 to apply a stay assisting torque to the rear wheel 22, such that the electrically assisted bicycle 1 stays in the position where the rider wants to stay. In the second mode, the electrically assisted bicycle 1 stays in the position, for example, even on an upward slope without moving backwards.

The second mode is executed by controlling the electric motor 60 so that the revolution speed of the electric motor 60 becomes zero, for example. The motor controller 95 obtains a rotation of a rotor of the electric motor 60 from the motor rotation sensor 99 of the electric motor 60. The motor controller 95 calculates a stay command value so that the stay assisting torque is generated which matches an angular acceleration of the electric motor 60. The motor controller 95 transmits the calculated stay command value to the motor driver 105. The motor driver 105 supplies electric power corresponding to the stay command value to the electric motor 60. This applies the stay assisting torque to the rear wheel 22 to cause the electrically assisted bicycle 1 to stay in the position.

Alternatively, an inclination sensor may be provided on the electrically assisted bicycle 1 to detect an inclination angle of the bicycle with respect to a vertical direction of a road surface, so that a stay assisting force is calculated in response to an output from the inclination sensor. For example, the electrically assisted bicycle 1 stays in the position by calculating a greater stay assisting force as the inclination angle becomes greater.

The third mode is a mode in which the electric motor 60 applies a walk-push assisting torque to the rear wheel 22. In the third mode, the motor controller 95 outputs a walk-push command value to the motor driver 105. This causes the electric motor 60 to apply the walk-push assisting torque to the rear wheel 22. Then, the walk-push assisting torque is applied to the rear wheel 22 of the electrically assisted bicycle 1. It should be noted that the motor controller 95 is configured or programmed to calculate the walk-push command value according to parameters such as the vehicle speed at that time, the degree of gradient of the upward slope, the vehicle weight, the steering torque and the like, for example. The motor controller 95 may be configured or programmed to calculate a walk-push command value so that the electrically assisted vehicle 1 is propelled at a predetermined speed, for example, a speed of about 6 km/h which is the walking speed of a human being.

The fourth mode is a mode in which the electrically assisted motor 60 applies a propelling assisting toque to the rear wheel 22 which assists the electrically assisted bicycle 1 to be propelled. The fourth mode is such that the electric motor 60 is caused to apply a torque so as to assist with the pedal torque exerted by the rider while the electrically assisted bicycle 1 is being propelled. Since the fourth mode is a control executed in a conventional electrically assisted bicycle, the detailed description thereof will be omitted here.

The electrically assisted bicycle 1 according to the present preferred embodiment is able to switch the modes among the first mode, the second mode, and the third mode by the operation of the operator 56. The operator 56 preferably includes the first operator 71 and the second operator 72. It should be noted that the fourth mode may be selected by the operation of the operator 56 or may be operated by an operator which differs from the operator 56.

Figure 3:
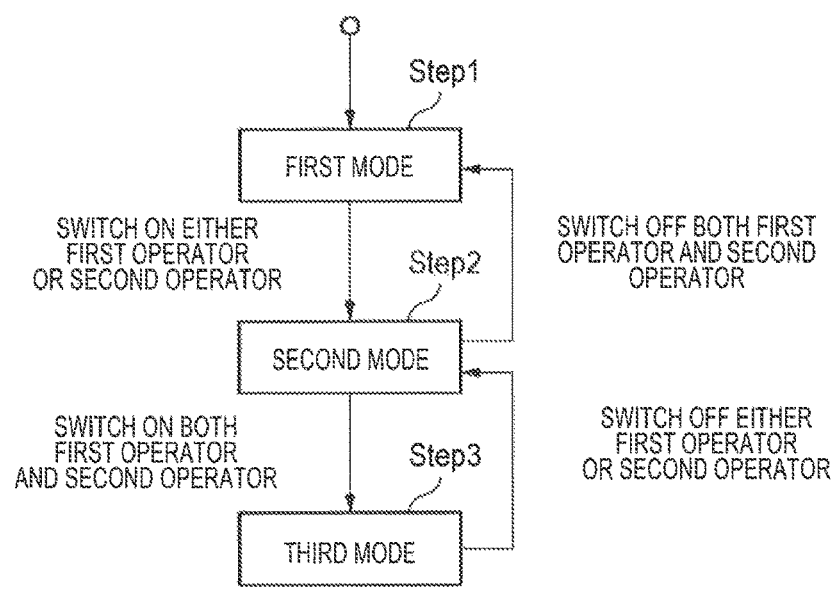
FIG. 3 is a flowchart showing an operation of selecting a third mode to a first mode in the electrically assisted bicycle according to the first preferred embodiment of the present invention.

FIG. 3 is a flowchart showing an operation of selecting the first mode to the third mode in the electrically assisted bicycle 1 according to the present preferred embodiment. In the electrically assisted vehicle 1 according to this preferred embodiment, the first mode to the third mode are selected by switching on/off the first operator 71 and the second operator 72 of the operator 56.

When the rider switches on the first operator 71 of the operator 56, the first operator 71 transmits an ON signal to the motor controller 95. When the rider switches on the second operator 72 of the operator 56, the second operator 72 transmits an ON signal to the motor controller 95.

As shown in Step 1 in FIG. 3, the motor controller 95 executes the first mode immediately after a power supply of the vehicle is switched on. In addition, in the case of the motor controller 95 receiving no ON signal from both the first operator 71 and the second operator 72, that is, in the case neither of the first operator 71 and the second operator 72 is operated and remain switched off, the motor controller 95 executes the first mode.

In the first mode, when the motor controller 95 receives an ON signal from either of the first operator 71 and the second operator 72, that is, when either the first operator 71 or the second operator 72 is operated to be switched on, the motor controller 95 cancels the first mode and executes the second mode (Step 2).

In the second mode, when the motor controller 95 receives the ON signal from neither of the first operator 71 and the second operator 72, that is, when both the first operator 71 and the second operator 72 are switched off, the motor controller 95 cancels the second mode, and executes the first mode. This puts the electrically assisted bicycle 1 in such a state that no torque is applied to the rear wheel 22 from the electric motor 60.

In the second mode, when the motor controller 95 receives ON signals from both the first operator 71 and the second operator 72, that is, when both the first operator 71 and the second operator 72 are switched on, the motor controller 95 cancels the second mode, and executes the third mode (Step 3).

In the third mode, when the motor controller 95 does not receive the ON signal from either the first operator 71 or the second operator 72, that is, when either of the first operator 71 and the second operator 72 is switched off while the other remains switched on, the motor controller 95 cancels the third mode and executes the second mode.

In addition, in the second mode, when the motor controller 95 receives the ON signal from neither of the first operator 71 and the second operator 72, that is, when both the first operator 71 and the second operator 72 are switched off, the motor controller 95 cancels the second mode, and executes the first mode.

In this way, in the electrically assisted bicycle 1 according to the first preferred embodiment, the first mode, the second mode, and the third mode are able to be selected by the rider operating the operator 56. Namely, the rider selects the first mode, the second mode, and the third mode in a positive manner. Due to this, when the rider wants to stay in a certain position on an upward slope, the rider is able to easily execute the second mode. Alternatively, when the rider wants to move backwards on the upward slope, the rider is able to easily move backwards by selecting the first mode. Alternatively, when the rider attempts to propel the bicycle from the staying state by pushing it while walking on the upward slope, the rider obtains the walk-push assisting torque by executing easily the third mode by operating the operator 56. In this way, since the rider selects the first mode, the second mode, and the third mode in the positive manner, the output of the electric motor 60 does not interrupt the action that the rider wants to execute, such that the rider is able to select the mode which is suitable for the action that the rider wants to execute.

Particularly, in the electrically assisted bicycle 1 described above, when the rider operates the first operator 71 or the second operator 72 without selecting either of the first operator 71 and the second operator 72, the stay assisting torque is applied to allow the bicycle to stay in the position where the rider wants to stay, such that the rider easily stays with the bicycle in that position, and the convenience of the rider is enhanced.

In the first preferred embodiment described above, while the modes are preferably selected by operating the first operator 71 and the second operator 72 of the operator 56, the present invention is not limited thereto. Next, a second preferred embodiment of the present invention will be described. Like reference numerals will be given to like elements of the first preferred embodiment, and the description thereof will be omitted.

Figure 4:
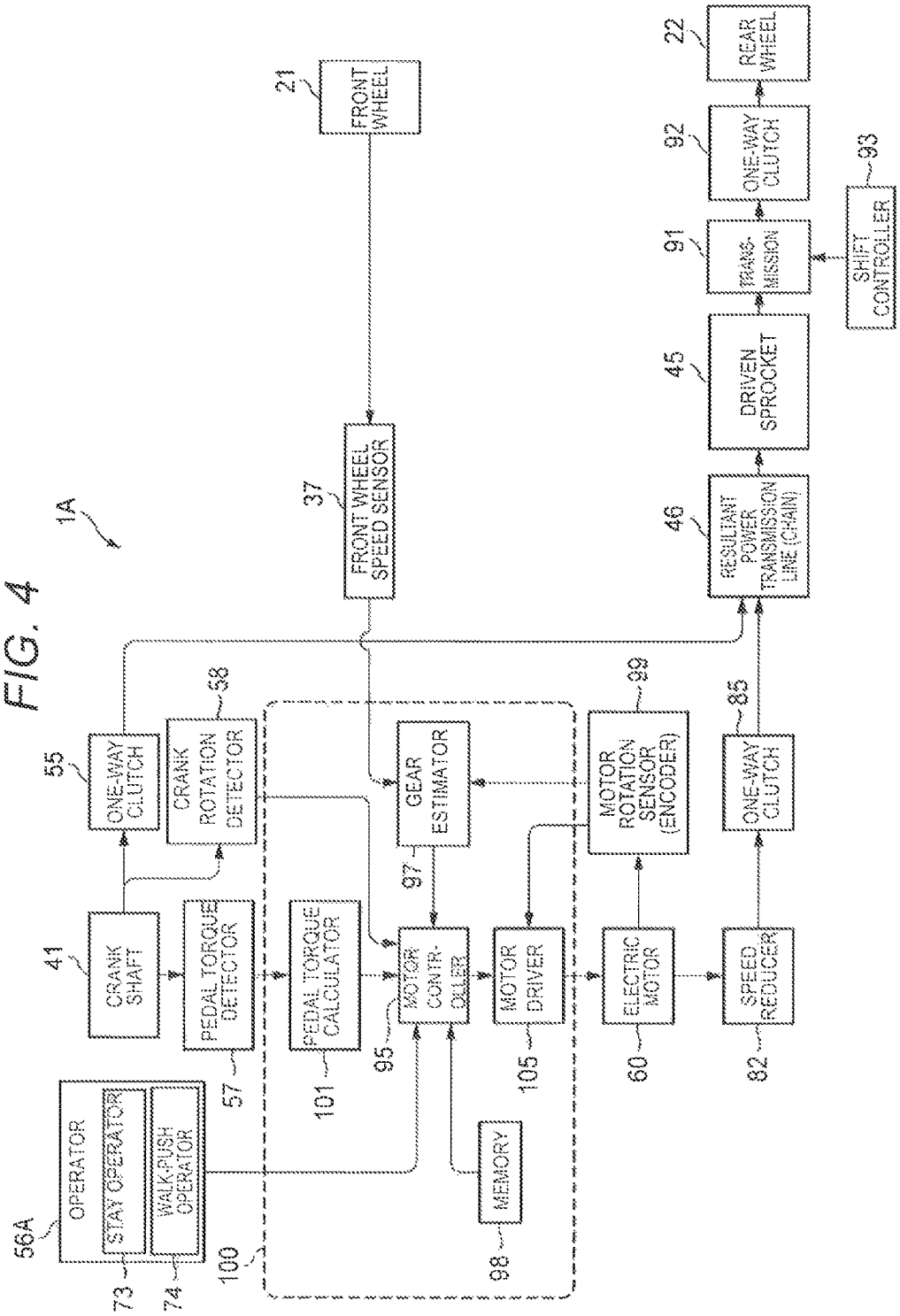
FIG. 4 is a block diagram showing functions of an electrically assisted bicycle according to a second preferred embodiment of the present invention.
Figure 5:
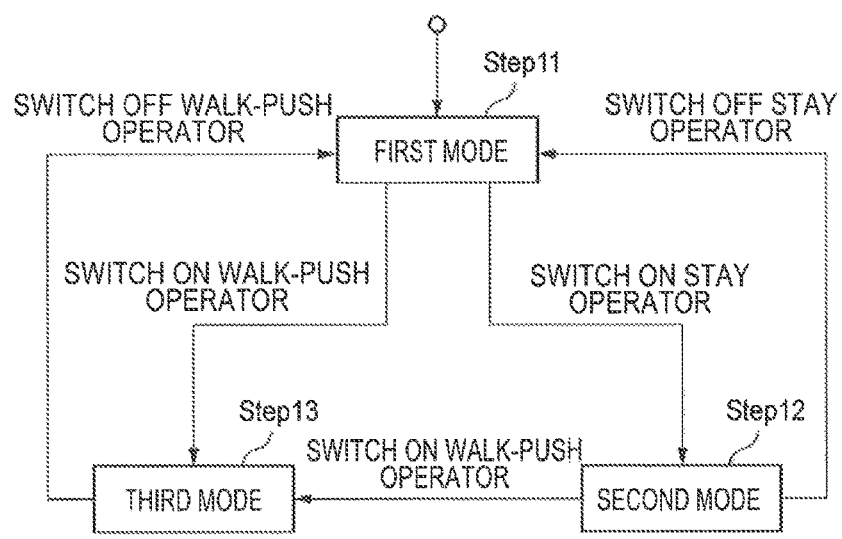
FIG. 5 is a flowchart showing an operation of selecting a first mode to a third mode in the electrically assisted bicycle according to the second preferred embodiment of the present invention.

FIG. 4 is a block diagram showing the functions of an electrically assisted bicycle 1A according to a second preferred embodiment. FIG. 5 is a flowchart showing an operation of selecting a first mode to a third mode in the electrically assisted bicycle 1A according to the second preferred embodiment.

As shown in FIG. 4, in the electrically assisted bicycle 1A according to the second preferred embodiment, an operator 56A includes a stay operator 73 and a walk-push operator 74.

In the electrically assisted vehicle 1A, a first mode to a third mode is selected by switching on/off the stay operator 73 and the walk-push operator 74 of the operator 56A. When the rider switches on the stay operator 73 of the operator 56A, the stay operator 73 transmits an ON signal to a motor controller 95. When the rider switches on the walk-push operator 74 of the operator 56A, the walk-push operator 74 transmits an ON signal to the motor controller 95.

As shown in FIG. 5, when a power supply of the vehicle is switched on, the motor controller 95 executes the first mode (Step 11). In addition, in the case of the motor controller 95 receiving no ON signal from the stay operator 73 and the walk-push operator 74, that is, in the case that the stay operator 73 and the walk-push operator 74 remain switched off, the motor controller 95 executes the first mode.

In the first mode, in the case of the motor controller 95 receiving no ON signal from the walk-push operator 74 but receiving an ON signal from the stay operator 73, that is, in the case of the walk-push operator 74 being not operated to remain switched off but the stay operator 73 being operated to be switched on, the motor controller 95 cancels the first mode and executes the second mode (Step 12). This causes the motor controller 95 to output a stay command value to the motor driver 105.

In the second mode, when the motor controller 95 receives an ON signal from neither of the stay operator 73 and the walk-push operator 74, that is, when both the stay operator 73 and the walk-push operator 74 are switched off, the motor controller 95 cancels the second mode, and executes the first mode.

In the first mode, when the motor controller 95 receives an ON signal from the walk-push operator 74, that is, when the walk-push operator 74 is switched on, the motor controller 95 cancels the first mode and executes the third mode (Step 13).

Similarly, in the second mode, too, when the motor controller 95 receives an ON signal from the walk-push operator 74, that is, when the walk-push operator 74 is switched on, the motor controller 95 cancels the second mode, and executes the third mode.

When the third mode is executed, the motor controller 95 outputs a walk-push command value to a motor driver 105, and an electric motor 60 applies a walk-push assisting torque to a rear wheel 22. Then, the walk-push assisting torque is applied to the rear wheel 22 of the electrically assisted bicycle 1.

In the third mode, when the motor controller 95 does not receive the ON signal from the walk-push operator 74, that is, when the walk-push operator 74 is switched off, the motor controller 95 cancels the third mode and executes the first mode.

In this way, in the electrically assisted bicycle 1A according to the second preferred embodiment, the motor controller 95 executes the third mode when the walk-push operator 74 is operated irrespective of the operation of the stay operator 73. Consequently, the walk-push assisting torque is obtained as soon as the rider wants to have the walk-push assisting torque.

Next, a third preferred embodiment of the present invention will be described. Like reference numerals will be given to like elements to those of the first preferred embodiment, and the description thereof will be omitted.

Figure 6:
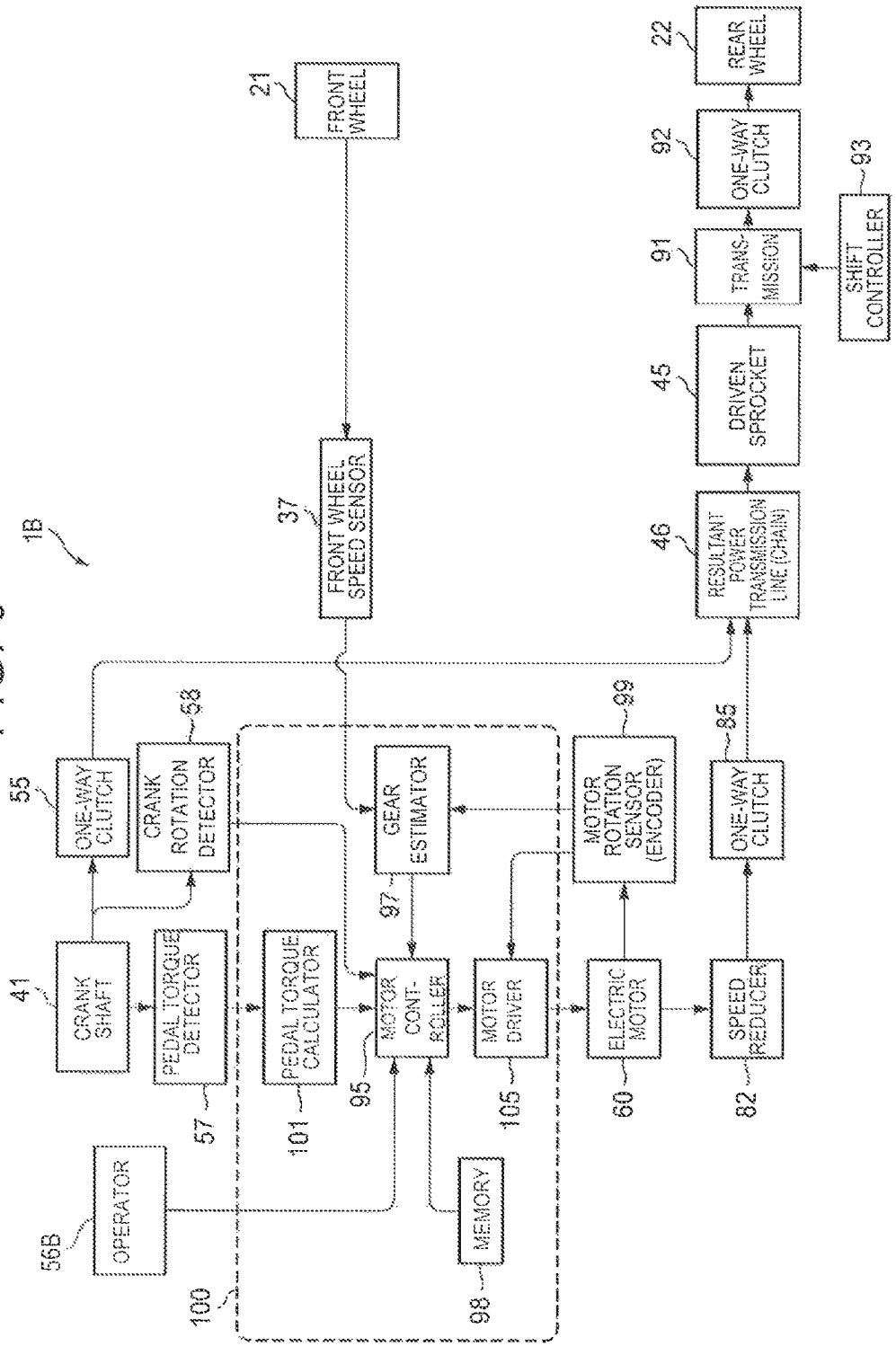
FIG. 6 is a block diagram showing functions of an electrically assisted bicycle according to a third preferred embodiment of the present invention.

FIG. 6 is a block diagram showing the functions of an electrically assisted bicycle 1B according to a third preferred embodiment. FIG. 7 is a flowchart showing an operation of selecting a first mode to a third mode in the electrically assisted bicycle 1B according to the third preferred embodiment.

As shown in FIG. 6, in the electrically assisted bicycle 1B according to third preferred embodiment, a single operator 56B is provided. The operator 56B is, for example, a switch which outputs an ON signal while being kept pressed.

In the electrically assisted bicycle 1B, a first mode to a third mode is able to be selected by operating the operator 56B. When the rider operates the operator 56B, the operator 56B transmits an ON signal to a motor controller 95. Then, the motor controller 95 shifts the first mode, the second mode, and the third mode in a predetermined order in response to the reception of an ON signal from the operator 56B.

Next, examples of shifting the modes from the first mode to the third mode by the operator 56B in the electrically assisted bicycle 1B will be described.

Figure 7B:
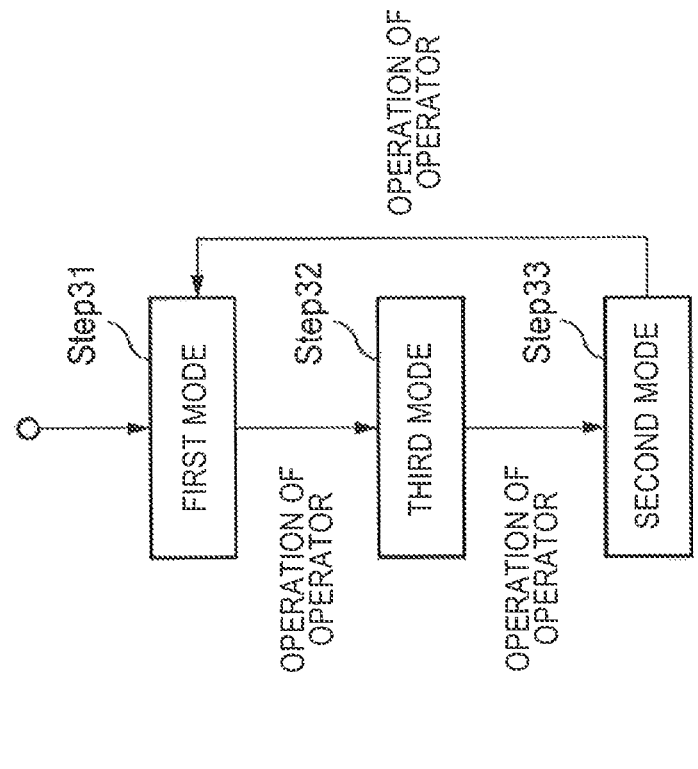
FIGS. 7A and 7B are flowcharts showing an operation of selecting a third mode to a first mode in the electrically assisted bicycle according to the first preferred embodiment of the present invention.
Figure 7A:
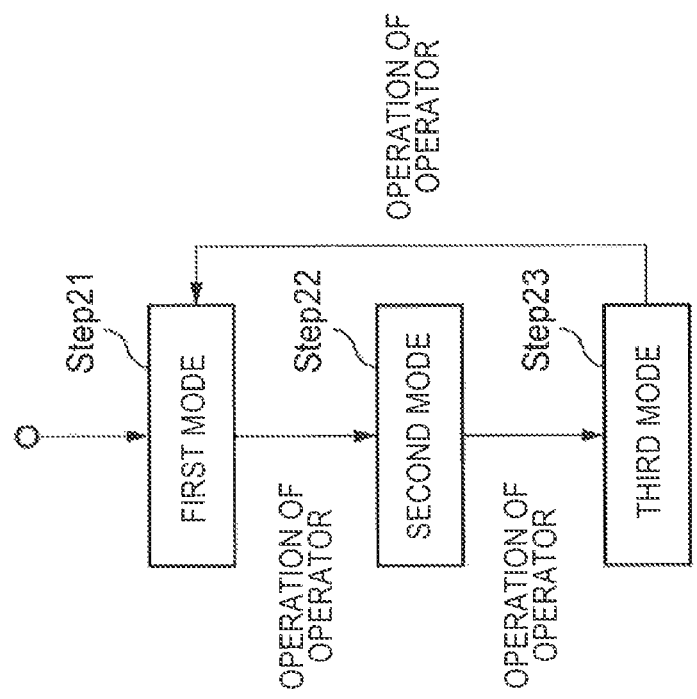

FIG. 7A is a flowchart showing a first shifting example. As shown in FIG. 7A, in the first shifting example, when a power supply of the vehicle is switched on, the first mode is selected. After the power supply of the vehicle is switched on, the motor controller 95 switches the modes sequentially in the order of the first mode, the second mode, and the third mode every time the motor controller 95 receives an ON signal from the operator 56B. When the motor controller 95 receives an ON signal from the operator 56B at the time of selecting the third mode, the motor controller 95 executes the first mode.

Alternatively, the motor controller 95 may shift the modes as in a second shifting example in place of the first shifting example. FIG. 7B is a flowchart showing the second shifting example. As shown in FIG. 7B, in this second shifting example, when the power supply of the vehicle is switched on, the first mode is selected. After the power supply of the vehicle is switched on, the motor controller 95 switches the modes sequentially in the order of the first mode, the third mode, and the second mode every time the motor controller 95 receives an ON signal from the operator 56B. When the motor controller 95 receives an ON signal from the operator 56B at the time of selecting the second mode, the motor controller 95 executes the first mode.

In this way, in the electrically assisted bicycle 1B according to the third preferred embodiment, since the rider selects the first mode to the third mode by operating the single operator 56B, the rider is able to select the modes through a simple operation.

In the first to third preferred embodiments of the present invention, while the assisting torque is preferably applied to the rear wheel 22, a configuration may be used in which the assisting torque is applied to the front wheel 21.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electrically assisted bicycle comprising:
    an electric motor that applies a walk-push assisting torque to a wheel of the bicycle when a rider pushes the bicycle;
    a controller configured or programmed to execute a first mode in which the electric motor applies no torque to the wheel, a second mode in which the electric motor applies a stay assisting torque to the wheel which allows the electrically assisted bicycle to stay in a position, and a third mode in which the electric motor applies the walk-push assisting torque to the wheel; and
    an operator operable by the rider to select the first mode, the second mode, or the third mode; wherein
    the operator includes a first operator and a second operator which differs from the first operator, the first operator and the second operator are operable by the rider to select the first mode, the second mode, or the third mode by switching on/off the first operator and the second operator, or
    the operator is a single operator, and the controller executes shifting of the modes in an order of the first mode, the second mode, and the third mode or in an order of the first mode, the third mode, and the second mode in response to reception of an ON signal from the single operator.

2. The electrically assisted bicycle according to claim 1, wherein
    the operator includes the first operator and the second operator which differs from the first operator;
    the controller is configured or programmed to execute the first mode when the first operator and the second operator are not operated;
    the controller is configured or programmed to execute the second mode when the first operator or the second operator is operated; and
    the controller is configured or programmed to execute the third mode when the first operator and the second operator are operated.

3. The electrically assisted bicycle according to claim 1, wherein
    the operator includes the first operator and the second operator which differs from the first operator;
    the first operator is a stay operator and the second operator is a walk-push operator;
    the controller is configured or programmed to execute the first mode when the stay operator and the walk-push operator are not operated;
    the controller is configured or programmed to execute the second mode when the walk-push operator is not operated and the stay operator is operated; and
    the controller is configured or programmed to execute the third mode when the walk-push operator is operated irrespective of the operation of the stay operator.

* * * * *